Dec. 29, 1970           K. A. STETSON           3,551,018

TOTAL INTERNAL REFLECTION HOLOGRAPHY

Filed May 1, 1969

INVENTOR.
KARL A. STETSON
BY
*Robert J. Bird*
ATTORNEY

United States Patent Office 3,551,018
Patented Dec. 29, 1970

3,551,018
TOTAL INTERNAL REFLECTION HOLOGRAPHY
Karl A. Stetson, Wenner Gren Center F31,
Sveavagen 166, 11346 Stockholm, Sweden
Filed May 1, 1969, Ser. No. 820,834
Int. Cl. G02 27/22
U.S. Cl. 350—3.5                                    1 Claim

ABSTRACT OF THE DISCLOSURE

Holography technique in which either or both the object and reference beams are totally reflected from the air/emulsion surface of the hologram plate.

BACKGROUND OF THE INVENTION

This invention is related to holography and in particular to a new technique for making holograms which employs a reference beam that is totally reflected from the air/emulsion boundary of the hologram plate.

In conventional holography, an object beam is directed to reflect from or to transmit through an object, from which it carries encoded information about the object to a photographic plate, or hologram. A reference beam, typically emanating from the same source, is directed around the object so as not to be disturbed thereby and toward the hologram at an angle relative to the object beam so as to interfere with the reflected or transmitted object beam at the hologram plate. The complex pattern of constructive and destructive interference fringes is then recorded on the hologram.

One of the practical applications of the hologram is in the field of microscopy in wrich there are two general approaches. In the first, herein called pre-magnification holographic microscopy, a microscopic object is illuminated by an object beam, which then passes through an ordinary microscope forming a magnified image of the object. A hologram plate is disposed at the image plane of the microscope, and here a reference beam is directed to interfere with the object beam creating the interference pattern which is recorded on the plate to form the hologram. Thus, a hologram is taken of the magnified image of a microscopic object.

The present invention is related to the second approach, that being referred to as post-magnification holographic microscopy. In this technique, a hologram is recorded of the actual microscopic object. The reconstruction of this hologram is then viewed through a microscope creating a magnified image of the hologram image. One such experiment, involving post-magnification, was performed in which a hologram plate was simply inserted in a container of a specimen of sea water. The sea water contained microscopic organisms and these were the subjects through which an object beam was shaped and directed at the hologram plate. A reference beam was made to interfere at the plate with the object beam and resulting interference pattern was recorded. The result was a holographic storage of the microscopic objects without magnification. On reconstruction, these objects remain microscopic. This reconstructed image was then viewed under a microscope, the adjustment of the microscope enabling the viewer to examine the total sea water specimen at any image plane.

It has been proposed to make a hologram by a technique in which object and reference beams are incident from opposite sides of the hologram plate. The incident reference beam suffers total internal reflection and thus the incident and reflected beams are in effect a pair of reference beams, each interfering in a separate pattern with the object beam. This is more fully described in a paper by Karl A. Stetson in "Applied Physics Letters," Oct. 1, 1967, p. 225.

The resolution and signal-to-noise ratio obtained by the author (the present inventor) rendered his conception of little apparent practical utility at the time of this paper. Further experimentation corrected these faults and resulted in the present invention.

It is an object of the present invention to provide a holographic technique enabling the object and the hologram to be disposed closely adjacent to one another.

Another object is to provide a holographic technique with an optimized signal-to-noise ratio.

Another object is to provide a total-internal-reflection hologram technique with improved resolution.

Another object is to provide a practical total-internal-reflection hologram technique.

Another object is to provide a new lensless holographic microscopy technique.

Other objects, advantages and features of the present invention will become apparent from the following description thereof when taken in connection with the accompanying drawing.

SUMMARY OF THE INVENTION

Briefly, the present invention includes a holography process and apparatus in which an object beam is directed through a transparency (object) and onto an adjacent hologram plate separated from the object only by a small space.

A reference beam is directed to the opposite side of the hologram plate at such an angle that there is total internal reflection of the reference beam, within the hologram plate, as the air/emulsion surface thereof.

On reconstruction, a beam similar to the reference beam is directed at the hologram, and is totally internally reflected therein, reconstructing an image of the original object which may be viewed as with a microscope.

DRAWING

Figure 1:
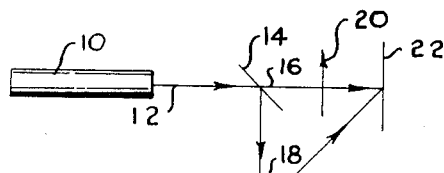
FIG. 1 is a schematic representation of a conventional holography arrangement known to the prior art.

Referring now to FIG. 1, there is shown a typical holographic apparatus known to the prior art. It includes a laser 10 producing a light beam 12 which is split by a beam splitter 14 into an object beam 16 and a reference beam 18. The object beam 16 is directed through an object transparency 20 and onto a photographic plate or hologram 22. The reference beam 18 is directed around the object 20, so as to be undisturbed thereby, and onto hologram plate 22, by means of a mirror 24. The object beam 16, having passed through object 20 and having been disturbed thereby, carries encoded information about the object to the hologram plate 22. The reference beam 18, on the other hand, is directed undisturbed to the hologram where it interferes with the object beam, establishing a pattern of constructive and destructive interference fringes which is recorded on the hologram.

It will be apparent that there must be some appreciable separation between object 20 and hologram 22 so that reference beam 18 can be directed around the object and at the hologram without striking the object.

Figure 2:
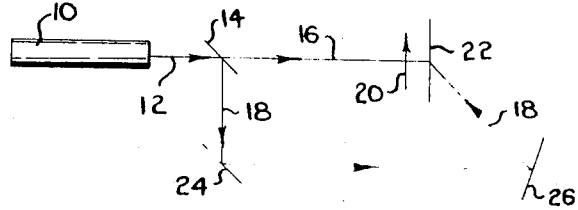
FIG. 2 is a schematic representation of a holography recording arrangement according to the present invention.

Referring now to FIG. 2, wherein like numerals designate like elements, a laser 10 is shown which produces a light beam 12 which is split into an object beam 16 and a reference beam 18 by means of beam splitter 14. Object beam 16 is directed through an object transparency 20 and onto a closely adjacent hologram plate 22. Reference beam 18 is directed from beam splitter 14 to mirror 24, thence to mirror 26 from which it is directed toward the opposite side of hologram 22.

Figure 3:
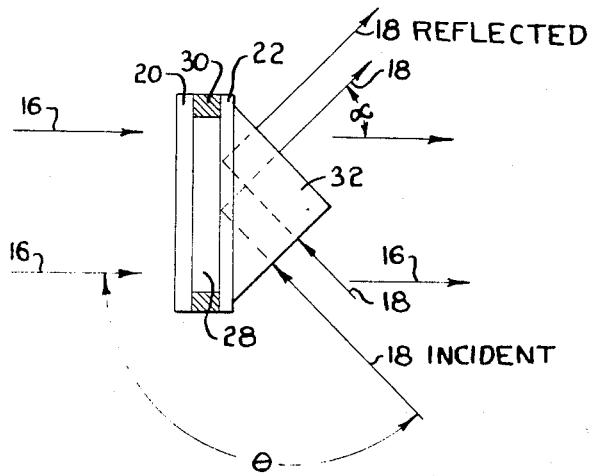
FIG. 3 is a more detailed view of part of the arrangement of FIG. 2.

Referring now to FIG. 3, there is shown in more detail the object 20 and hologram 22, as related to object beam 16 and reference beam 18. The hologram 22 and the object 20 are separated by a small air space 28 and spacers 30. Space 28 may contain fluid other than air if desired for a particular purpose. The sole criterion is that the substance in space 28 must be of a refractive index lower than that in hologram plate 22 so as to permit total internal reflection in plate 22. A prism 32 is also mounted on the hologram 22, on the opposite side thereof from object 20. The interface between hologram 22 and prism 32 is liquified with a suitable oil or other liquid to facilitate light transmission through this interface. The prism is of a suitable configuration so as to direct the reference beam 18 into the hologram 22 at such an angle that there is total internal reflection of reference beam 18 at the air/emulsion surface of hologram 22. This totally reflected reference beam then passes out from the hologram, through the liquid interface, and through prism 32. Thus, the reconstructed beam 18 is made to interfere at the hologram surface with object beam 16 without interfering with the object 20, permitting close positioning of the object relative to the hologram.

The fluids in space 28 and in the interface between hologram 22 and prism 32, and the angular configuration of prism 32 are all dictated by Snell's law. According to Snell's law, which applies when light rays traverse a plurality of transmitting media, $n \sin \phi = n' \sin \phi$, where $n$ is the refractive index of the transmitting medium and $\phi$ is the angular displacement of the transmitted light ray from the normal to the interface between media.

The incidence of reference beam 18 on hologram plate 22, as a given angle $\theta$ relative to the object beam provides an interference pattern of a first given spatial frequency. The reflection of reference beam 18 from hologram plate 22, at an angle $\alpha$ relative to the transmitted object beam 16, provides an interference pattern of a second and different spatial frequency. Thus, there are in effect two reference beams, 18 incident and 18 reflected.

The different angles of interference, $\alpha$ and $\theta$, create interference patterns of different spatial frequencies. In general, the reference beam 18 incident is associated with the higher spatial frequency pattern and the reference beam 18 reflected is associated with the lower spatial frequency pattern. Both recorded patterns may give rise to Bragg effects, but with differing magnitudes, which may or may not be desirable depending upon the circumstances.

The placement of the object close to the hologram offers advantages for the formation of microscopic images of the object details. The cone of light scattered from each detail of the object intersects only a small area on the hologram, and therefore nonuniformities of the hologram do not distort such small wavelets significantly upon reconstruction. The close spacing also minimizes the effects of chromatic dispersion, reconstruction source size, and hologram orientation relative to the reconstruction beam.

The short propagation distance from object to hologram prevents the mixing of strong and weak signals from the object on the hologram and, therefore, eliminates most of the spurious noise that results from the nonlinear recording of a conventional hologram.

It has been found that varying the parameters yields varying results. That is, resolution of images and signal-to-noise ratio are affected by the relative intensities of the object and reference beams. Ratios of intensity of reference and object beams were tried. The prior art teaches in general that the intensity of the reference beam should be greater than that of the object beam by several magnitudes. It has been found as an attribute of the present invention that an intensity ratio of reference beam to object beam of approximately 1 to 1 yields best results. It has been found that through control of this beam ratio and density of the developed hologram it is possible to control image definition and edge enhancement.

Figure 4:
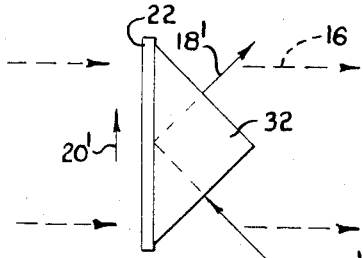
FIG. 4 is a schematic representation of an arrangement whereby to reconstruct recorded holograms according to the present invention.

Referring now to FIG. 4, an arrangement is shown whereby to reconstruct the image from the hologram recording. This apparatus includes hologram 22 with associated prism 32 disposed relative to a laser 10' which directs a reconstruction light beam 18' at the hologram in a direction to correspond to reference beam 18 in the recording process. Reconstruction beam 18' is similarly totally reflected within the hologram and emerges as shown from prism 32. At the same time, beam 18' effects the reconstruction of a virtual image 20' of the object 20, this image 20' being similarly disposed relative to hologram 22. It also effects the restoration of object beam 16, shown transmitting into and away from the hologram.

Figure 5:
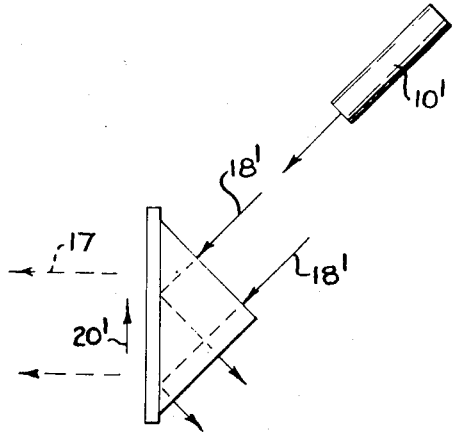
FIG. 5 is a schematic representation of another arrangement whereby to reconstruct recorded holograms according to the present invention.

Reconstruction may also be effected by directing the reconstruction beam 18' in a direction the reverse of the originally directed reference beam 18, that is by using the conjugate of reference beam 18. This is shown in FIG. 5. In FIG. 5, upon reconstruction by beam 18', the incident component of this beam will be diffracted by the low frequency interference pattern to construct the conjugate 17 of the original object beam 16 which will be transmitted out of the emulsion. The undiffracted component of reconstruction beam 18' will be totally reflected by the emulsion surface. The high frequency pattern will then diffract this reflected component into a second replica or conjugate of the original object beam 16. This second replica will also transmit out of the emulsion and will add to the previous construction of conjugate 17.

The two reconstructions due to the two effective reconstruction beams (18 incident and 18 reflected) are useful for some purposes, for example, hologram interferometry. The relative intensity of the two reconstructions can be controlled by Bragg effects and emulsion thickness control. By controlling the angle of the reconstructing beam relative to hologram surface, differing amounts of lateral displacement of the two images can be obtained, giving "shear" interferometry of the microscopic images.

When the distance from object to hologram is made approximately equal to the focal length of a typical microscope objective, and the reconstruction beam comes from a point source located near the original object, the hologram diffracts the reconstruction beam into a highly magnified image at distances in the order of 18 centimeters in the direction from which the original reference beam came. The distance is compatible with the use of a microscope eyepiece to view the image. In other words, if this hologram is placed on the stage of a microscope, the reconstruction of the microscopic objects via a nearly collimated reconstruction beam may be viewed through the objective and eyepiece of the microscope, or the reconstruction of magnified images via a point source reconstruction beam located near the original object may be viewed by the eyepiece of the microscope alone. Adjustments of the microscope enable the examiner to view the image of any image plane.

During recording of holograms according to this invention, the immersion liquid between the prism 32 and hologram plate 22 was benzene, primarily because of its volatility making it easily disposed of after each recording. During reconstruction, to avoid evaporation while examining the image, a light oil was the liquid used for optical contact between prism 32 and the hologram 22.

By the use of the total internal reflection technique of the present invention, it will be appreciated that the apparatus described is quite flexible and effective for a variety of holographic purposes. As one example, the total internal reflection characteristic could be eliminated by simply immersing the hologram plate in a suitable liquid for the practice of "conventional" holography. Furthermore, by controlling the angles of incidence and reflection, relative efficiencies of reference beams can be controlled. The present invention enables practical holography of microscopic objects in a post-magnification technique.

It may occur to others of ordinary skill in the art to make modifications of the present invention which will remain within the concept and scope thereof and not constitute a departure therefrom. Accordingly, it is intended that the invention be not limited by descriptive details but that it encompass all within the purview of the following claim.

What is claimed is:
1. Holography apparatus including:
    a source of coherent light,
    means to separate light from said source into an object beam and a reference beam of substantially equal intensity,
    a hologram plate having a first refractive index and disposed adjacent to an object transparency and separated therefrom by a narrow space containing a light-transmitting medium having a second and lower refractive index,
    a prism mounted on the surface of said hologram plate opposite said light-transmitting medium, said prism and said plate being in substantial optical continuity at their interface,
    means to direct said object beam through said object transparency and through said hologram plate,
    means to direct said reference beam through said prism and into said hologram plate, said reference beam being totally internally reflected at the interface between said hologram and said medium and transmitting therefrom through said hologram plate and said prism, and
    the incident and reflected phases of said reference beam constituting in effect a distinct pair of reference beams.

References Cited

Friesem et al., "Effects of Film Nonlinearities in Holography," 6 Applied Optics, pp. 1755–1759 (10/1967).

DAVID SCHONBERG, Primary Examiner

R. L. SHERMAN, Assistant Examiner